(12) United States Patent
Chen et al.

(10) Patent No.: US 7,832,744 B2
(45) Date of Patent: Nov. 16, 2010

(54) STROLLER AND BACKREST RECLINE DEVICE THEREOF

(75) Inventors: Shun-Min Chen, Taipei (TW); Ru-Yi Li, Taipei (TW)

(73) Assignee: Wonderland Nurserygoods Co., Ltd., Neihu, Taipei (TW)

( * ) Notice: Subject to any disclaimer, the term of this patent is extended or adjusted under 35 U.S.C. 154(b) by 231 days.

(21) Appl. No.: 12/170,437

(22) Filed: Jul. 10, 2008

(65) Prior Publication Data

US 2009/0014986 A1 Jan. 15, 2009

Related U.S. Application Data

(60) Provisional application No. 60/949,243, filed on Jul. 12, 2007.

(51) Int. Cl.
B62B 9/12 (2006.01)
(52) U.S. Cl. .................. 280/47.4; 280/642; 280/47.41; 297/354.12
(58) Field of Classification Search .................. 280/39, 280/38, 642, 643, 644, 646, 647, 648, 650, 280/658, 47.38, 47.34; 297/354.12, 366, 297/16.1, 16.2, 17, 42, 45
See application file for complete search history.

(56) References Cited

U.S. PATENT DOCUMENTS 5,749,627 A 5/1998 Perego
6,322,097 B1 * 11/2001 Lan .............................. 280/642
6,616,367 B2 * 9/2003 Cheng ........................ 403/85
6,830,254 B2 * 12/2004 Lan ............................. 280/47.4
7,410,185 B2 * 8/2008 Chen et al. .................. 280/642

FOREIGN PATENT DOCUMENTS

| CN | 2915623 Y | 6/2007 |
| GB | 2 363 365 A | 12/2001 |
| GB | 2 398 039 A | 8/2004 |
| GB | 2 404 172 A | 1/2005 |
| GB | 2 438 607 A | 12/2007 |

* cited by examiner

Primary Examiner—J. Allen Shriver, II
Assistant Examiner—Erez Gurari
(74) Attorney, Agent, or Firm—Winston Hsu; Scott Margo

(57) ABSTRACT

A stroller includes a main frame, a backrest, a backrest adjustor, and a linkage device. There is a guide rail formed inside the backrest adjustor. A positioning part of the backrest engages with the guide rail. When a handle of the linkage device is moved upward, a connecting component of the linkage device drives a pushing component of the linkage device to move upward along a supporting rod of the backrest. Accordingly, a protruding portion of the pushing component drives the backrest adjustor to rotate relative to a supporting frame of the main frame so as to release the positioning part from the guide rail.

20 Claims, 7 Drawing Sheets

STROLLER AND BACKREST RECLINE DEVICE THEREOF

CROSS REFERENCE TO RELATED APPLICATIONS

This application claims the benefit of U.S. Provisional Application No. 60/949,243, filed on Jul. 12, 2007 and entitled "Seat Recline Device for Stroller" the contents of which are incorporated herein by reference.

BACKGROUND OF THE INVENTION

1. Field of the Invention

The present invention relates to a stroller and a backrest recline device thereof, and more specifically, to a stroller with a backrest adjusting mechanism and a backrest recline device thereof.

2. Description of the Prior Art

For parents, a stroller is a convenient and common tool for taking care of a baby. Thus, government agencies have established many related laws and safety regulations for design of the stroller so as to ensure the safety of the baby while it is in the stroller. Furthermore, comfort and convenience of the stroller are also design concerns.

For increasing the comfort that the baby feels, a backrest installed on a stroller is usually an adjustable structure. A method of utilizing grips disposed at two sides of a stroller respectively to adjust an inclined angle of the backrest is commonly used. Please refer to FIG. 1. FIG. 1 is a side view of a stroller 10 according to the prior art. As shown in FIG. 1, the stroller 10 comprises a main frame 12, a backrest 14, a grip 16, a connecting rod 18, a backrest adjustor 20, and a spring 22. The connecting rod 18 is connected to the grip 16 and the backrest adjustor 20. The backrest adjustor 20 is pivotally connected to the main frame 12. A tooth groove 24 is formed in the backrest adjustor 20. A positioning part 26 is disposed on the backrest 14. The positioning part 26 may be a pin. The positioning part 26 is used for engaging with the tooth groove 24 so as to fix the inclined angle of the backrest 14 relative to the main frame 12. The spring 22 is connected to the main frame 12 and the backrest adjustor 20. Furthermore, another side of the stroller also has a similar mechanism, and the related description is omitted herein for simplicity. In such a manner, when a user wants to change the inclined angle of the backrest 14, the user needs to press the grip 16 downward to move the connecting rod 18 upward so that the backrest adjustor 20 connected to the connecting rod 18 may be rotated upward relative to the main frame 12. Accordingly, the positioning part 26 of the backrest 14 may be separated from the tooth groove 24 so as to release the backrest 14 from the main frame 12. Subsequently, the user pushes the backrest 14 to rotate relative to the main frame 12. After the backrest 14 is rotated to a desired angle by the user, the user may release the grip 16. At this moment, the tooth groove 24 is engaged with the positioning part 26 again by elastic force provided from the spring 22 so as to fix the adjusted angle of the backrest 14 relative to the main frame 12. As mentioned above, the backrest adjusting mechanism according the prior art needs the user to use two hands to adjust the inclined angle of the backrest since the user needs to press the grips disposed at two sides of the stroller respectively at the same time, and therefore it is inconvenient in use. Another common method is to utilize a connecting rod to pull a connecting line connected to backrest adjustors disposed at two sides of the stroller respectively for adjusting the inclined angle of the backrest. Although the said method allows the user to finish the adjustment of the inclined angle of the backrest with only one hand, it still has a problem of complication in structure design.

SUMMARY OF THE INVENTION

The present invention provides a stroller comprising a main frame formed with two supporting frames disposed at two sides of the stroller respectively, the two supporting frames being symmetrical with each other; a seat frame; a backrest disposed between the two supporting frames comprising a supporting rod structure, one end of which is pivotally connected to the seat frame; and a positioning part disposed on the supporting rod structure; a backrest adjustor, one end of which is pivotally connected to one of the two supporting frames, a guide rail being formed in the backrest adjustor for engaging with the positioning part; and a linkage device disposed on the backrest comprising a handle; a pushing structure sheathing the supporting rod structure in a sliding manner and having a protruding portion, the protruding portion abutting against the backrest adjustor; and a connecting component disposed between the handle and the pushing structure for driving the pushing structure to move upward along the supporting rod structure when the handle of the linkage device is moved upward, so that the protruding portion of the pushing structure drives the backrest adjustor to rotate relative to the supporting frame of the main frame so as to release the positioning part from the guide rail.

The present invention further provides a backrest recline device of a stroller, which the stroller has supporting rods of a backrest therein, comprising a positioning part disposed on the supporting rod; a backrest adjustor, one end of which is pivotally connected to the stroller, having a plurality of positioning grooves therein which is capable of engaging with the positioning part; and a linkage device disposed on the backrest comprising a handle; a pushing structure sheathing the supporting rod in a sliding manner and having a protruding portion, the protruding portion abutting against the backrest adjustor; and a connecting component disposed between the handle and the pushing structure for driving the pushing structure to move upward along the supporting rod when the handle of the linkage device is moved upward; wherein when the positioning part engages with one of the positioning grooves, the pushing structure rests on the positioning part as well.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
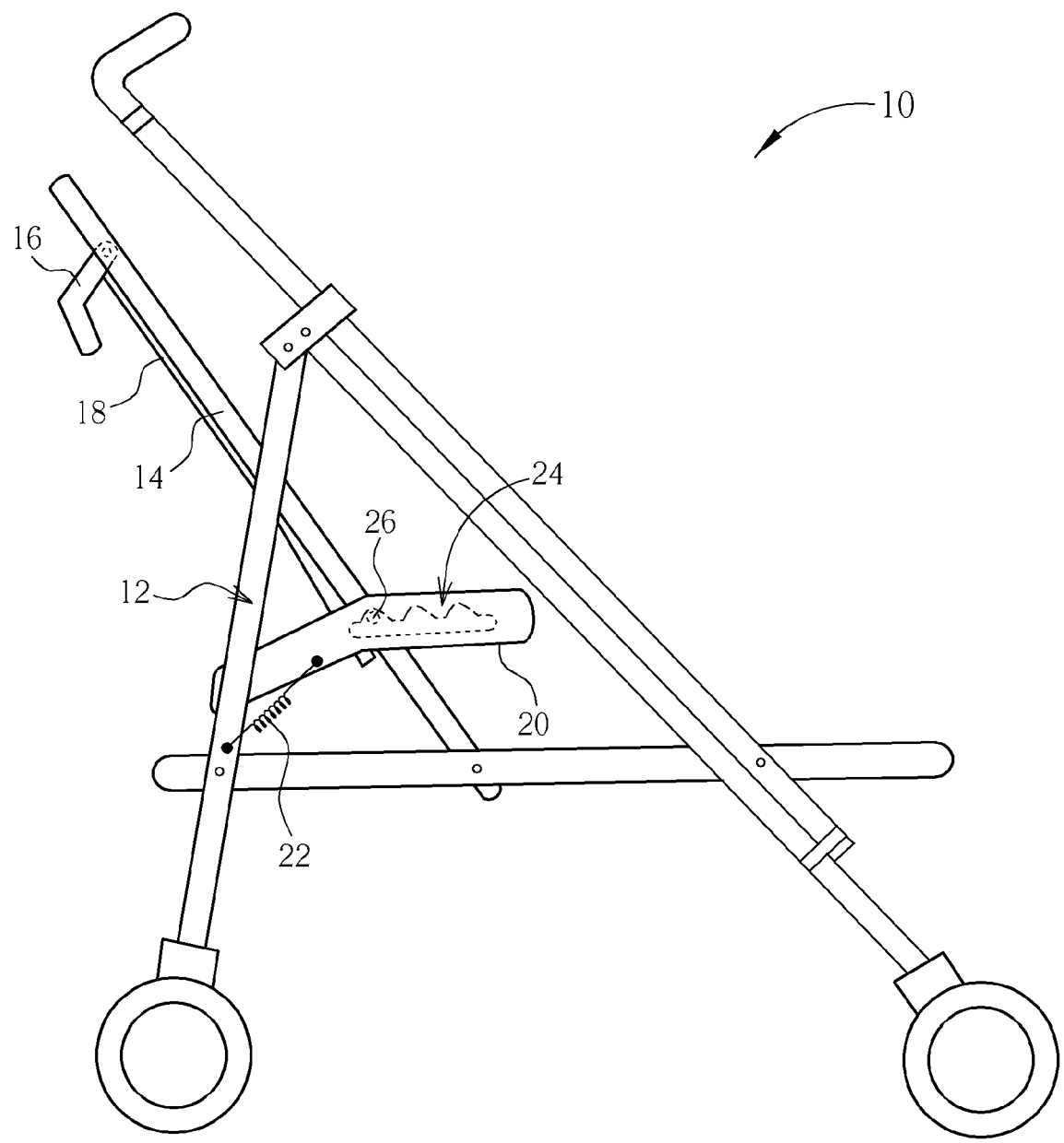
FIG. 1 is a side view showing a stroller according to the prior art.
Figure 2:
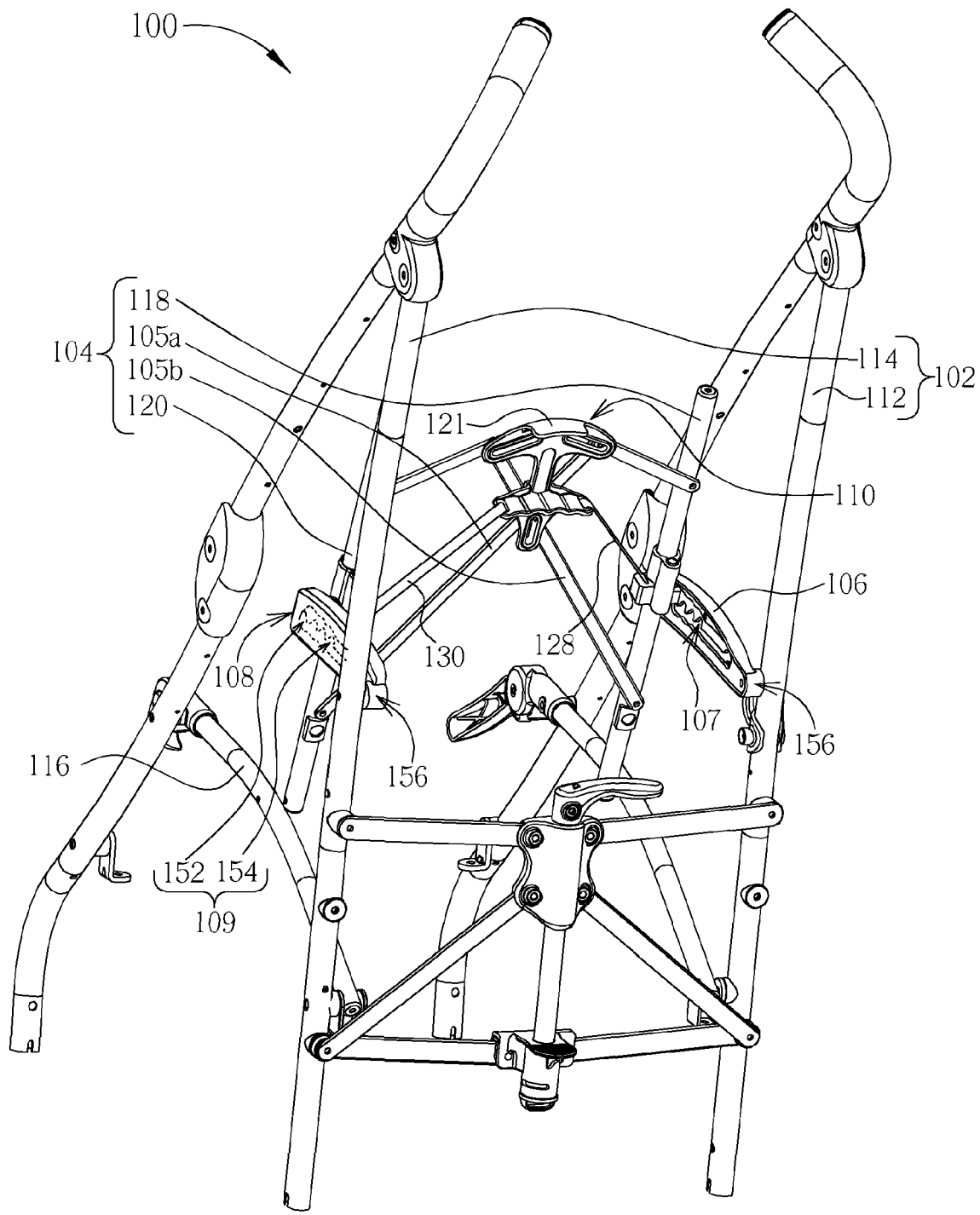
FIG. 2 is a schematic view showing a stroller according to a first embodiment of the present invention.

Please refer to FIG. 2. FIG. 2 is a schematic view showing a stroller 100 according to a first embodiment of the present invention. The stroller 100 comprises a main frame 102, a backrest 104, a backrest adjustor 106, a backrest adjustor 108, a linkage device 110 and a seat frame 116. The main frame 102 is formed of a first supporting frame 112 and a second supporting frame 114 disposed at two sides of the stroller 100 respectively. The first supporting frame 112 and the second supporting frame 114 are symmetrical with each other. The first supporting frame 112 and the second supporting frame 114 are connected to the seat frame 116 respectively. The backrest 104 is disposed between the first supporting frame 112 and the second supporting frame 114. The backrest 104 comprises two backrest rods 105a, 105b and a supporting rod structure. The supporting rod structure comprises a first supporting rod 118 and a second supporting rod 120. As shown in FIG. 2, two backrest rods 105a, 105b are disposed between the first supporting rod 118 and the second supporting rod 120 and are pivotally connected to each other and also pivotally connected to the first supporting rod 118 and the second supporting rod 120 individually at ends. One end of the first supporting rod 118 is pivotally connected to the seat frame 116 that is connected to the first supporting frame 112. One end of the second supporting rod 120 is pivotally connected to the seat frame 116 that is connected to the second supporting frame 114. One end of the backrest adjustor 106 is pivotally connected to the first supporting frame 112. A guide rail 107, which has cavity-down positioning grooves, is formed in the backrest adjustor 106. One end of the backrest adjustor 108 is pivotally connected to the second supporting frame 114. A guide rail 109, which has cavity-down positioning grooves, is formed in the backrest adjustor 108.

Figure 3:
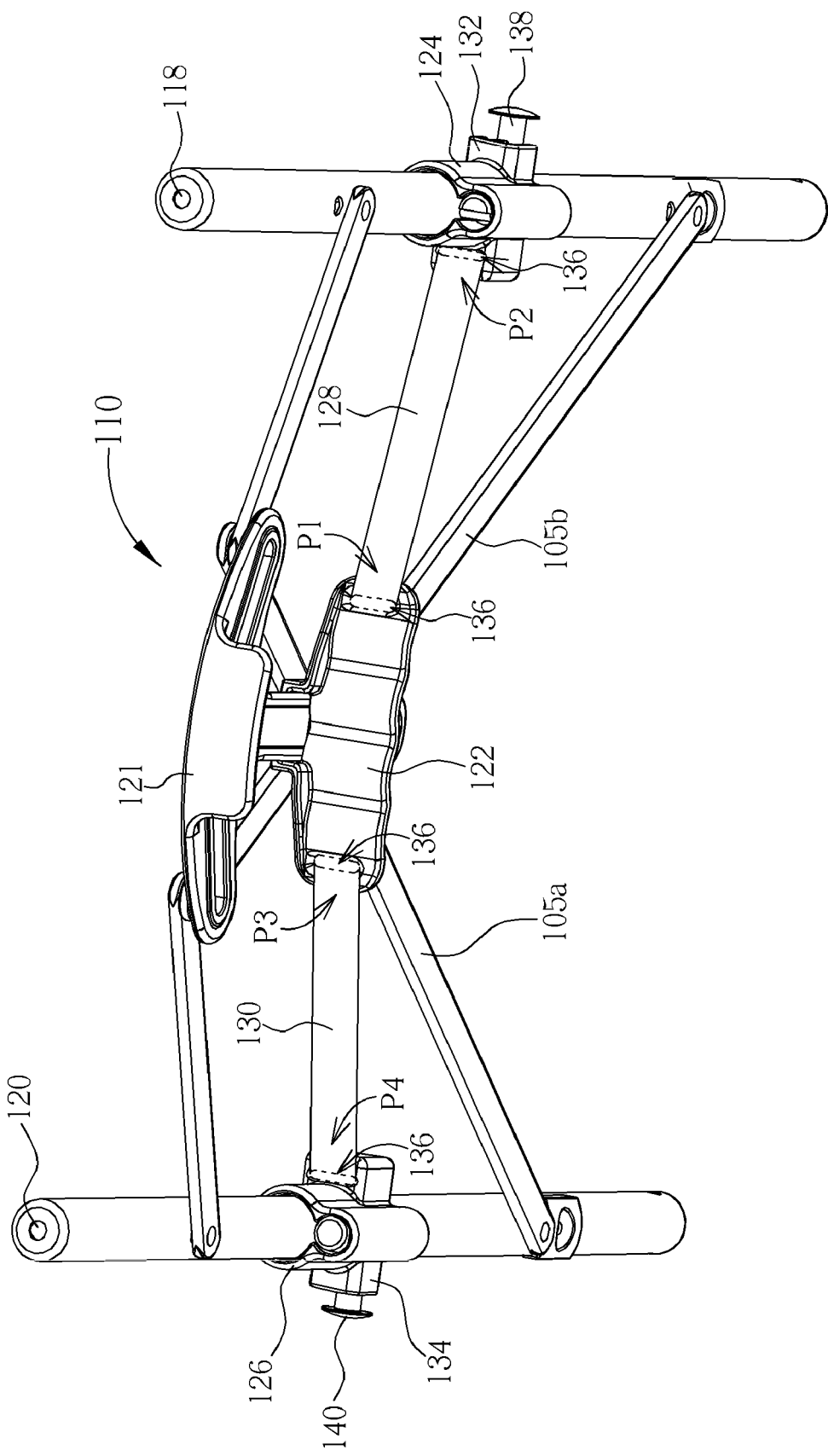
FIG. 3 is an enlarged diagram of the linkage device in FIG. 2.

Next, please refer to FIG. 3. FIG. 3 is an enlarged diagram of the linkage device 110 in FIG. 2. The linkage device 110 is disposed on the reverse side of the backrest 104 (as shown in FIG. 2). The linkage device 110 comprises a handle 122, a handle base 121, a pushing structure comprising a first pushing component 124 and a second pushing component 126, a first connecting component 128, and a second connecting component 130. The handle base 121 has two wing portions and one vertical portion at the connection of the wing portions. The handle base 121 is connected to the backrest rods 105a, 105b respectively by two rivets at wing portions. The handle 122 sheathes the vertical portion of the handle base 121 in a sliding manner, and a rivet is utilized to connect with the chute of the handle 122 and the backrest rods 105a, 105b so as to allow the handle 122 to connect with the backrest 104 in a sliding manner. The first pushing component 124 sheathes the first supporting rod 118 in a sliding manner and has a first protruding portion 132. The second pushing component 126 sheathes the second supporting rod 120 in a sliding manner and has a second protruding portion 134. In this embodiment, the first connecting component 128 and the second connecting component 130 are webs. The first connecting component 128 has a first end P1 and a second end P2, and the second connecting component 130 has a third end P3 and a fourth end P4. The first end P1 passes through one connecting hole 136 of the handle 122 nearing the first pushing component 124 and connects to one end of the handle 122, and the second end P2 passes through the connecting hole 136 of the first pushing component 124 and connects to the first pushing component 124. Likewise, the third end P3 passes through another connecting hole 136 of the handle 122 nearing the second pushing component 126 and connects to another end of the handle 122, and the fourth end P4 passes through the connecting hole 136 of the second pushing component 126 and connects to the second pushing component 126. The connection of the first connecting component 128 with the handle 122 and the first pushing component 124 respectively may be achieved in many different ways. For example, the first connecting component 128 may be tied with the handle 122 and the first pushing component 124 respectively after passing through the connecting holes 136. Likewise, the connection of the second connecting component 130 with the handle 122 and the second pushing component 126 respectively is the same as mentioned above. In the aforementioned embodiment of the present invention, the first connecting component 128 and the second connecting component 130 may be an independent web respectively. In another embodiment of the present invention, the first connecting component 128 and the second connecting component 130 may be also formed into one web together. That is to say, the said web formed of the first connecting component 128 and the second connecting component 130 may be connected to the first pushing component 124 and the second pushing component 126 respectively after passing through the connecting holes 136 of the handle 122. Furthermore, a first positioning part 138 and a second positioning part 140 are disposed on the first supporting rod 118 and the second supporting rod 120 of the backrest 104 respectively. As shown in FIG. 3, the first positioning part 138 and the second positioning part 140 are T-shaped rivets. The first positioning part 138 is used for engaging with the guide rail 107 of the backrest adjustor 106 shown in FIG. 2, and the second positioning part 140 is used for engaging with the guide rail 109 of the backrest adjustor 108 shown in FIG. 2. Moreover, the first positioning part 138 and the second positioning part 140 are also used for supporting the first pushing component 124 and the second pushing component 126 respectively (as shown in FIG. 3). However, the structures of the first positioning part 138 and the second positioning part 140 are not limited to the said structures, meaning that the first positioning part 138 and the second positioning part 140 may be other commonly used engaging mechanisms.

Figure 4:
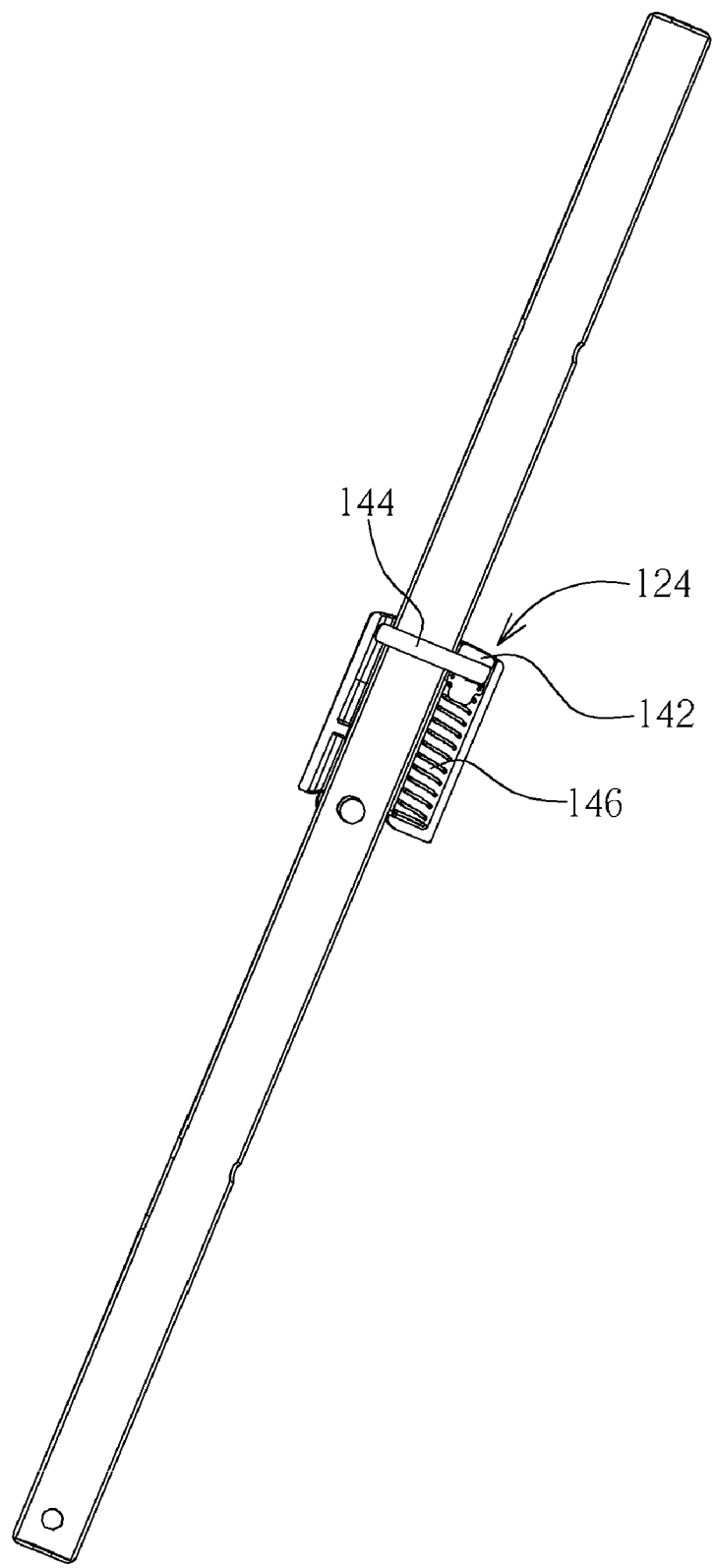
FIG. 4 is a perspective view showing the first pushing component in FIG. 3.
Figure 5:
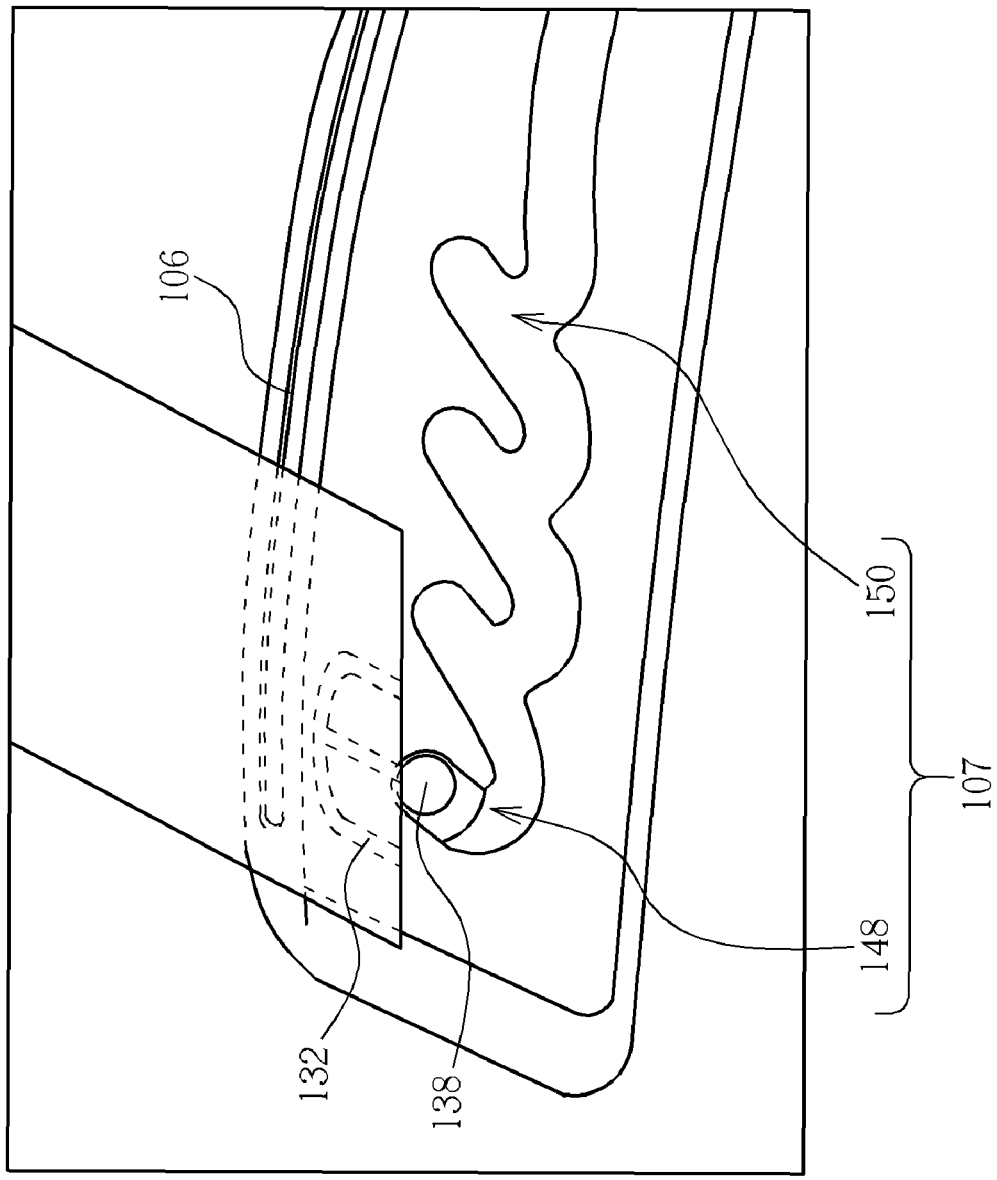
FIG. 5 is an enlarged diagram of the first positioning part in FIG. 3 engaging with the first positioning groove of the first guide rail.
Figure 6:
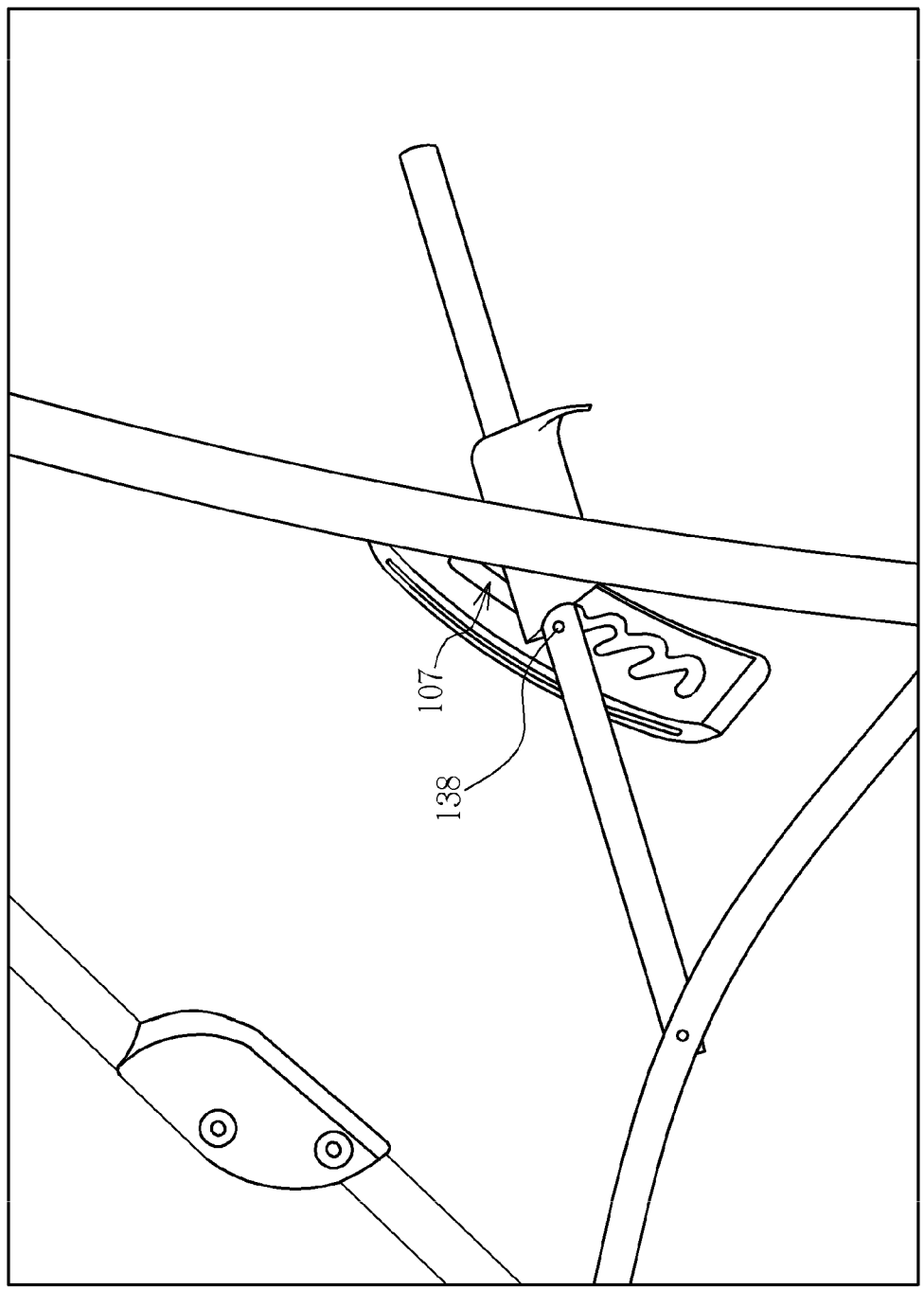
FIG. 6 is a diagram of the first positioning part in FIG. 3 engaging with the second positioning groove of the first guide rail.

More detailed description for adjustment of the inclined angle of the backrest 104 relative to the main frame 102 is provided as follows. First refer to FIG. 4. It is a schematic view showing the first pushing component 124 in FIG. 3. The first pushing component 124 has a fixing plastic plug 142, a fixing part 144, and a spring 146, which are disposed therein. The fixing part 144 is a pin disposed through the first supporting rod 118 and the fixing plastic plug 142 so as to fix the fixing plastic plug 142 on the first supporting rod 118. The spring 146 is connected to the fixing plastic plug 142 and the first pushing component 124. Furthermore, the structures formed in the second pushing component 126 are the same as those formed in the first pushing component 124, and therefore the related description is omitted herein. Next, please refer to FIG. 5. It is an enlarged diagram of the first positioning part 138 in FIG. 3 engaging with a first positioning groove 148 of the guide rail 107. The rivet head of the first positioning part 138 is utilized to engage with the first positioning groove 148 of the guide rail 107. At the same time, the first protruding portion 132 of the first pushing component 124 abuts against the upper edge of the backrest adjustor 106. In such a manner, the first supporting rod 118 of the backrest 104 may be fixed at an inclined angle shown in FIG. 2. Next, please refer to FIG. 2 and FIG. 5 at the same time. When a user wants to change the inclined angle of the first supporting rod 118, the user just needs to exert force on the handle 122 and move the handle 122 upward a specific distance along the handle base 121. At this moment, the first connecting component 128 connected to the handle 122 is moved upward accordingly so as to move the first pushing component 124 upward the specific distance along the first supporting rod 118 (the spring 146 is in a compressed state). Subsequently, the first protruding portion 132 abutting against the backrest adjustor 106 drives the backrest adjustor 106 to rotate upward relative to the first supporting frame 112, so as to release the first positioning part 138 from the first positioning groove 148 of the guide rail 107. Next, adjust the position of the first positioning part 138. For example, move the first positioning part 138 beneath a second positioning groove 150 of the guide rail 107, and the user may stop to exert force on the handle 122. At this moment, the first pushing component 124 is glided downward along the first supporting rod 118 by elastic force provided from the spring 146. Next, since the first protruding portion 132 of the first pushing component 124 does not abut against the backrest adjustor 106, the backrest adjustor 106 starts to rotate downward relative to the first supporting frame 112 by gravitational force so as to cause the second positioning groove 150 to engage with the first positioning part 138. Thus, the first supporting rod 118 may be fixed at an inclined angle shown in FIG. 6. Likewise, if the user wants to change the said inclined angle of the first supporting rod 118 again, all the user needs to do is to repeat the aforementioned operating process, and then the user may engage the first positioning part 138 with another positioning groove of the guide rail 107 so as to fix the first supporting rod 118 at another corresponding angle. Furthermore, the movement of the second positioning part 140 in the guide rail 109 is the same as that of the first positioning part 138 in the guide rail 107. For example, the second positioning part 140 may be moved from a third positioning groove 152 to a fourth positioning groove 154 with the movement of the handle 122 and the rotation of the second supporting rod 120 relative to the seat frame 116, and then engages with the fourth positioning groove 154 to fix the inclined angle of the second supporting rod 120 relative to the seat frame 116.

Figure 7:
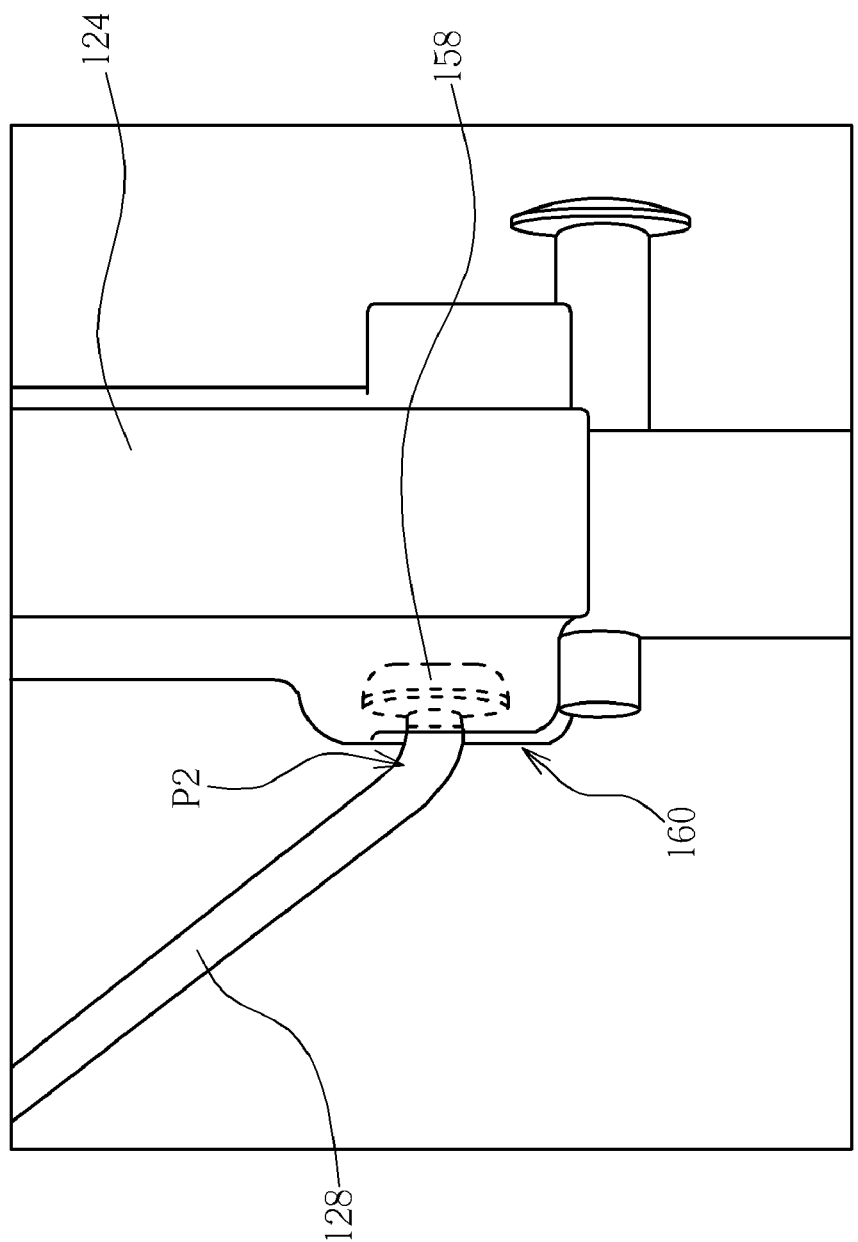
FIG. 7 is a diagram of the first connecting component connecting to the first pushing component according to another embodiment of the present invention.

It should be mentioned that the stroller 100 may further comprise torsion springs 156 disposed at a joint of the backrest adjustor 106 and the first supporting frame 112 and a joint of the backrest adjustor 108 and the second supporting frame 114 respectively (as shown in FIG. 2). In such a manner, when the user stops exerting force on the handle 122, the engagement of the backrest adjustor 106 and the backrest adjustor 108 with the first positioning part 138 and the second positioning part 140 respectively may be further strengthened by elastic force provided from the torsion springs 156. Furthermore, the first connecting component 128 mentioned above may also be a rigid connecting rod for increasing the structure strength of the linkage device 110. In this embodiment, the first end P1 of the first connecting component 128 is connected to the handle 122 in a rivet-locking manner. However, the connection of the first connecting component 128 and the handle 122 is not limited to the said method. For example, the first connecting component 128 and the handle 122 may also be formed monolithically. Similarly, the connection of the first connecting component 128 and the first pushing component 124 is not limited to the said method. For example, as shown in FIG. 7, the second end P2 of the first connecting component 128 may be formed with a T-shaped structure 158, and the first pushing component 124 is formed with a groove 160 corresponding to the T-shaped structure 158. The groove 160 is used for engaging with the T-shaped structure 158.

Thus, the second end P2 of the first connecting component 128 is connected to the first pushing component 124 by the engagement of the T-shaped structure 158 and the groove 160. The said connecting method may also be applied to the connection of the second pushing component 126 and the second connecting component 130, and the related description is omitted herein for simplicity.

Compared with the prior art involving pressing grips downward by two hands of a user or utilizing a complicated linkage device for angle adjustment of a backrest, the present invention just utilizes a connecting component to connect a handle with a pushing component so that the angle adjustment of the backrest may be achieved easily. In such manner, only one hand is needed to adjust the inclined angle of the backrest, and therefore the convenience of the stroller is increased considerably. Furthermore, the present invention can also simplify the structure design of the related linkage mechanism, and therefore the manufacturing cost of the stroller may be decreased accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller comprising:
   a main frame formed with two supporting frames disposed at two sides of the stroller respectively, the two supporting frames being symmetrical with each other;
   a seat frame;
   a backrest disposed between the two supporting frames comprising:
      a supporting rod structure, one end of which is pivotally connected to the seat frame; and
      a positioning part disposed on the supporting rod structure, the positioning part being a T-shaped rivet;
   a backrest adjustor, one end of which is pivotally connected to one of the two supporting frames, having a guide rail being formed in the backrest adjustor for engaging with the positioning part; and
   a linkage device disposed on the backrest comprising:
      a handle;
      a pushing structure sheathing the supporting rod structure in a sliding manner and having a protruding portion, the protruding portion abutting against the backrest adjustor, and a bottom edge abutting against the positioning part when the positioning part engages into a positioning groove of the guide rail; and
      a connecting component disposed between the handle and the pushing structure for driving the pushing structure to move upward along the supporting rod structure when the handle of the linkage device is moved upward, so that the protruding portion of the pushing structure drives the backrest adjustor to rotate relative to the supporting frame of the main frame so as to release the positioning part from the positioning groove of the guide rail.

2. The stroller of claim 1, wherein the connecting component is a rigid connecting rod.

3. The stroller of claim 2, wherein the handle and the connecting component are monolithically formed.

4. The stroller of claim 2, wherein one end of the connecting component is formed with a T-shaped structure, the pushing structure is formed with a groove corresponding to the T-shaped structure, and the T-shaped structure is engaged with the groove.

5. The stroller of claim 1, wherein the handle and the pushing structure have a connecting hole respectively, and a first end and a second end of the connecting component are disposed through the connecting holes of the handle and the pushing structure respectively.

6. The stroller of claim 1, wherein the handle has a connecting hole, the supporting rod structure comprises two supporting rods pivotally connected to two sides of the seat frame respectively, the pushing structure comprises two pushing components sheathing the two supporting rods respectively in a sliding manner, the connecting component passes through the connecting hole of the handle, and two ends of the connecting component are connected to the two pushing components respectively.

7. The stroller of claim 1, wherein the stroller further comprises a torsion spring disposed at a joint of the backrest adjustor and the supporting frame.

8. The stroller of claim 1, wherein the backrest comprises a backrest rod, the linkage device comprises a handle base, the handle base and the handle are connected to the backrest rod respectively, and the handle sheathes the handle base slidably.

9. The stroller of claim 8, wherein the handle base has a vertical portion, the handle sheathes the vertical portion of the handle base slidably.

10. The stroller of claim 1, wherein the linkage device further comprises:
   a fixing plastic plug disposed in the pushing structure;
   a fixing part disposed in the pushing structure and connected to the supporting rod structure and the fixing plastic plug for fixing the fixing plastic plug on the supporting rod structure; and
   a spring connected to the fixing plastic plug and the pushing structure.

11. The stroller of claim 10, wherein the fixing part is a pin disposed through the supporting rod structure and the fixing plastic plug.

12. The stroller of claim 1, wherein the guide rail is formed with a plurality of positioning grooves, and the positioning part engages with one of the positioning grooves when the backrest is reclined selectively.

13. A backrest recline device of a stroller, which the stroller has supporting rods of a backrest therein, comprising:
   a positioning part disposed on the supporting rod, the positioning part being a T-shaped rivet;
   a backrest adjustor, one end of which is pivotally connected to the stroller, having a plurality of positioning grooves therein which is capable of engaging with the positioning part; and
   a linkage device disposed on the backrest comprising:
      a handle;
      a pushing structure sheathing the supporting rod in a sliding manner and having a protruding portion, the protruding portion abutting against the backrest adjustor, and a bottom edge abutting against the positioning part when the positioning part engages into one of the positioning grooves; and
      a connecting component disposed between the handle and the pushing structure for driving the pushing structure to move upward along the supporting rod when the handle of the linkage device is moved upward.

14. The backrest recline device of claim 13, wherein the handle and the pushing structure have a connecting hole respectively, and a first end and a second end of the connecting component are disposed through the connecting holes of the handle and the pushing structure respectively.

15. The backrest recline device of claim 13, wherein the handle has a connecting hole, the pushing structure comprises two pushing components sheathing the supporting rods respectively in a sliding manner, the connecting component passes through the connecting hole of the handle and connects to the two pushing components at two ends respectively.

16. The backrest recline device of claim 13, wherein the backrest comprises a backrest rod, the linkage device comprises a handle base, the handle base and the handle are connected to the backrest rod respectively, and the handle sheathes the handle base slidably.

17. The backrest recline device of claim 16, wherein the handle base has a vertical portion, the handle sheathes the vertical portion of the handle base slidably.

18. The backrest recline device of claim 13, wherein the linkage device further comprises:
   a fixing plastic plug disposed in the pushing structure;
   a fixing part disposed in the pushing structure and passed through the supporting rod and the fixing plastic plug for fixing the fixing plastic plug on the supporting rod; and
   a spring connected to the fixing plastic plug and the pushing structure.

19. A stroller comprising:
   a main frame formed with two supporting frames disposed at two sides of the stroller respectively, the two supporting frames being symmetrical with each other;
   a seat frame;
   a backrest disposed between the two supporting frames comprising:
      a supporting rod structure, one end of which is pivotally connected to the seat frame; and
      a positioning part disposed on the supporting rod structure;
   a backrest adjustor, one end of which is pivotally connected to one of the two supporting frames, having a guide rail being formed in the backrest adjustor for engaging with the positioning part; and
   a linkage device disposed on the backrest comprising:
      a handle;
      a pushing structure sheathing the supporting rod structure in a sliding manner and having a protruding portion, the protruding portion abutting against the backrest adjustor;
      a fixing plastic plug disposed in the pushing structure;
      a fixing part disposed in the pushing structure and connected to the supporting rod structure and the fixing plastic plug for fixing the fixing plastic plug on the supporting rod structure; and
      a spring connected to the fixing plastic plug and the pushing structure; and
   a connecting component disposed between the handle and the pushing structure for driving the pushing structure to move upward along the supporting rod structure when the handle of the linkage device is moved upward, so that the protruding portion of the pushing structure drives the backrest adjustor to rotate relative to the supporting frame of the main frame so as to release the positioning part from a positioning groove of the guide rail.

20. The stroller of claim 19, wherein the fixing part is a pin disposed through the supporting rod structure and the fixing plastic plug.

* * * * *